R. Coreth's Gang Plows
No. 118,694. Patented Sep. 5, 1871.
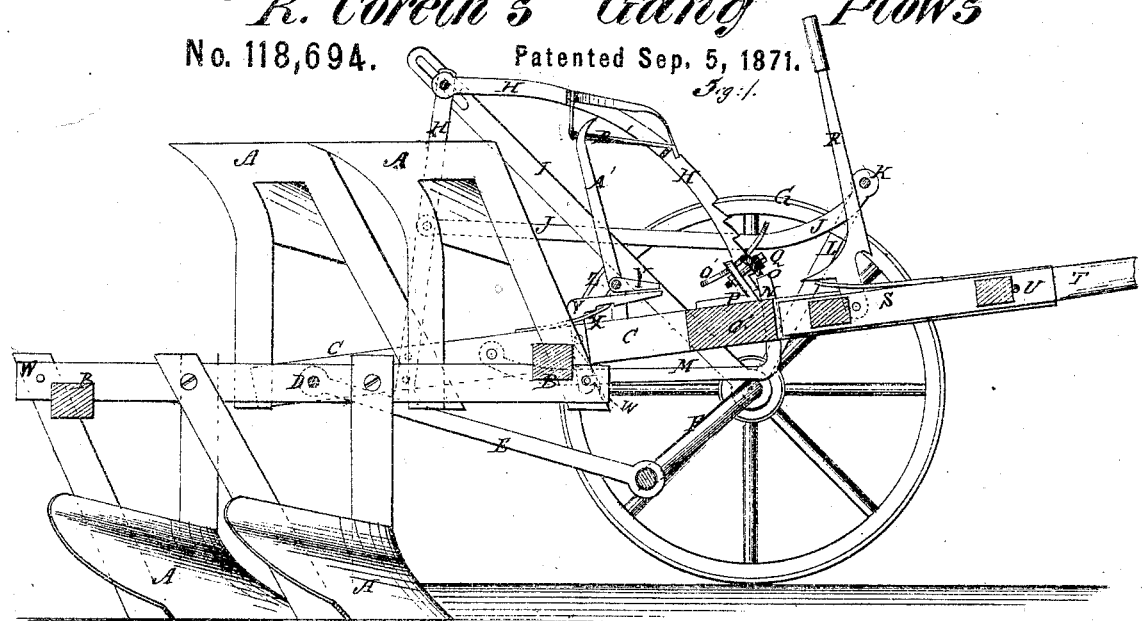
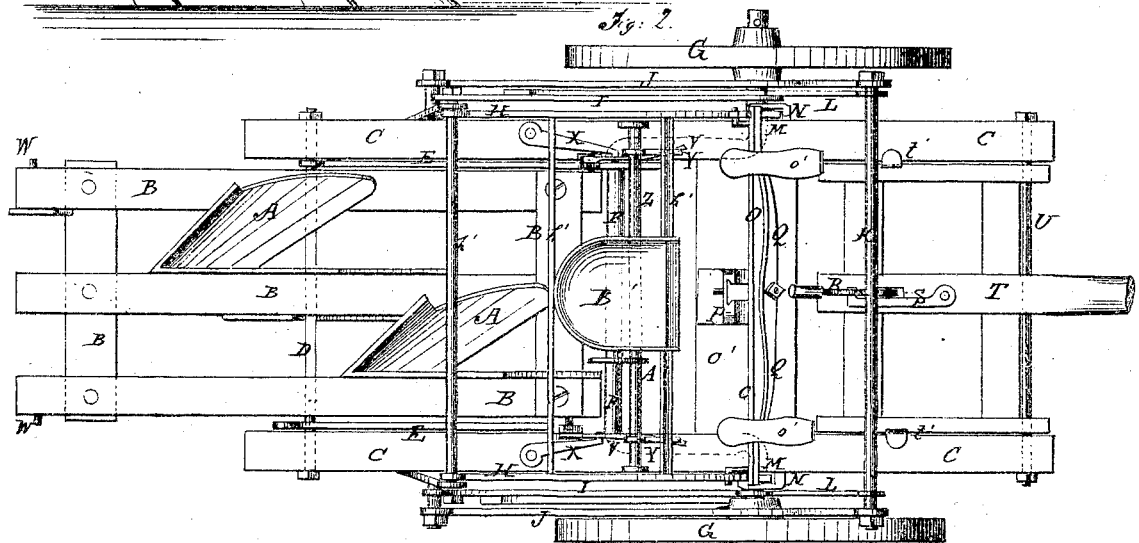
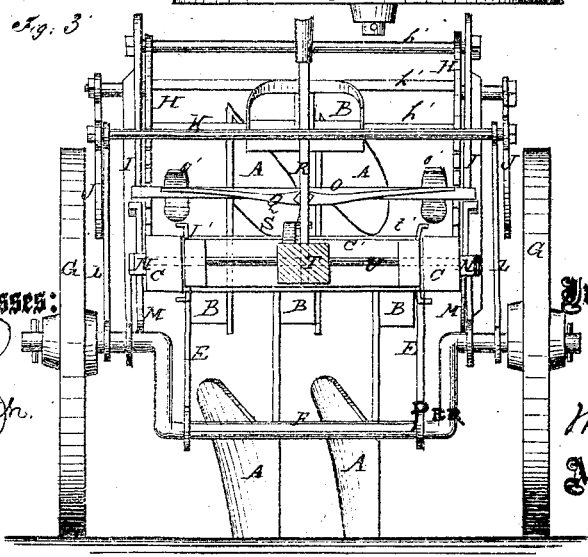
Witnesses:
Chas. Nida
Wm. H. C. Smith
Inventor:
R. Coreth.
Attorneys.

118,694

UNITED STATES PATENT OFFICE.

RUDOLPH CORETH, OF NEW BRAUNFELS, TEXAS.

IMPROVEMENT IN WHEEL-PLOWS.

Specification forming part of Letters Patent No. 118,694, dated September 5, 1871.

*To all whom it may concern:*

Be it known that I, RUDOLPH CORETH, of New Braunfels, in the county of Comal and State of Texas, have invented a new and useful Improvement in Gang-Plows; and I do hereby declare that the following is a full, clear, and exact description thereof, which will enable others skilled in the art to make and use the same, reference being had to the accompanying drawing forming part of this specification, in which—

Figure 1 is a vertical longitudinal section of my improved gang-plow. Fig. 2 is a top view of the same. Fig. 3 is a front view of the same.

Similar letters of reference indicate corresponding parts.

My invention has for its object to furnish an improved gang-plow, which shall be so constructed that the plowing may be done by passing back and forth in parallel lines, beginning at one side of the field and ending at the other side, instead of plowing in lands in the ordinary manner, and which shall, at the same time, be simple in construction, easily operated, and effective in operation; and it consists in the construction and combination of the various parts of the machine, as hereinafter more fully described.

A are the plows, four of which are used, two right-hand plows and two left-hand plows. The plows A are securely attached to the frame B, the right-hand plows projecting upon one side and the left-hand plows upon the other side, as shown in Figs. 1, 2, and 3. The frame B consists of three parallel longitudinal bars, connected at their ends by cross-bars. The frame B is pivoted to and between the rear ends of the side bars of the frame C by a long bolt, D, which passes through the rear ends of the said side bars of the frame C, and through the centers of the longitudinal bars of the frame B. By this construction the machine is adjusted to turn the furrows to the right hand or to the left hand by simply reversing the frame B. E are the draft-bars, the rear ends of which are pivoted to the long bolt D, and their forward ends are pivoted to the middle part of the axle F near the ends of said part. The axle F is bent twice at right angles near each end, thus giving it the form of a crank. G are the wheels, which revolve upon the ends or journals of the axle F. H are two angular frames, the forward arms of which are made curved, and which are connected by cross-bars $h'$, as shown in Figs. 2 and 3. The ends of the two frames H are securely and rigidly attached to the outer sides of the side bars of the frame C. I are two bars, the lower ends of which ride upon and are pivoted to the inner ends of the journals of the axle F. The upper ends of the bars I are connected with and pivoted to the frames H at their angles, by bolts which pass through slots in the upper ends of the said bars I, to give them the necessary play. J are two bars, the rear ends of which are pivoted to the rear arms of the frames H near their upper ends. The forward ends of the bars J are connected by the cross-rod or bar K. L are bars, the upper ends of which are pivoted to the ends of the bar or rod K. The lower ends of the bars L ride upon and are pivoted to the inner ends of the journals of the axle F. M are two bars, the rear ends of which are pivoted to the rear parts of the side bars of the frame C. The forward parts of the bars M are bent upward at right angles and are curved into an arc of a circle having its center at the pivoting-point of the said bars. The curved ends of the bars M pass up just in front of the lower part of the forward arms of the frame H, through keepers N attached to the side bars of the frame C. The lower edges of the bars M rest upon the upper sides of the inner ends of the journals of the axle F, so that by forcing the one or the other of the forward ends of the bars M downward the wheel upon that side of the machine will be depressed to enable it to run in the furrow while the machine remains level. O is a cross-bar, the ends of which rest upon the upper ends of the bars M, and which is pivoted at its center to a slotted standard, P, attached to the middle part of the cross-bar $c'$ of the frame C. The cross-bar O is arranged upon its pivot in such a way that it may both vibrate and rock upon it. Q is a spring, the middle part of which is connected with the middle part of the cross-bar O, and which is so arranged that its ends may press upward against the under side of the forward parts of the foot-rests $o'$ attached to the said cross-bar O near its ends. The spring Q thus inclines the upper edge of the cross-bar O to the rearward to catch upon the ratchet-teeth formed upon the forward edges of the lower parts of the curved forward arms of the frames H to hold the cross-bar O securely in any position into which it may be adjusted.

The construction enables the driver with his feet to depress either wheel to adapt it to run in the furrow. R is a lever, the lower end of which is pivoted to the rear part of the tongue or to the forward part of the frame C, and which has a notch formed in the forward side of its lower part to receive and hold the cross-bar K when said cross-bar is pressed down by the driver to raise the machine from the ground. Upon the rear side of the lower part of the lever R is formed an arm or shoulder, against which presses the free end of the spring S to hold the said lever forward so that it will catch upon the cross-bar K automatically as the said cross-bar is pressed down. T is the tongue, the hounds of which are fitted between the forward ends of the bars C, to which they are pivoted by a long bolt, U. To the sides of the rear ends of the hounds of the tongue T are attached short bars $t'$, the ends of which are bent outward to catch upon the bars C and thus limit the play of the said tongue. V are two bent levers, pivoted in notches or grooves in the inner sides of the bars C. Upon the inner sides of the lower arms of the bent levers V are formed inclined shoulders to guide the pins W attached to the sides of the ends of the frame B into the notches formed in the forward side of the lower ends of the said bent levers V to hold the frame B in working position and prevent it from revolving until the said levers V are tripped. The levers V are held in position to catch upon and hold the pins W by the springs X attached to the bars C, and which press against the upper arms of the said levers V. The upper arms of the levers V are pressed downward to release the pins W and allow the frame B to revolve by the toes Y attached to the shaft Z, which work in bearings attached to the bars C. To the shaft Z is attached the lower end of a lever, A′, which projects up into such a position that it may be conveniently reached and operated by the driver from his seat B′, which is attached to the cross-bars $h'$ that connect the forward parts of the frames H.

By this construction, when the lever A′ is operated to release the pins W the pressure of the ground against the plows causes the frame B to revolve, the end of which strikes the ground and raises the frame C, causing the wheels G to run back, and lowering the cross-bar K so that the catch-lever R may catch upon it and hold the frame C raised, so that, as the frame B again comes into position, the plows A will not touch the ground, and the machine may be turned or moved from place to place. When the machine is again brought into position for plowing the lever R is drawn back, which releases the cross-bars K and allows the frames C B to drop into position for the plows to enter the ground.

Having thus described my invention, I claim as new and desire to secure by Letters Patent—

1. In combination with a gang-plow frame, B, pivoted in another, C, the mechanism, consisting of bent levers V, pins W, spring X, toes Y, shaft Z, and levers A′, all arranged as and for the purpose described.

2. The frame-work H $h'$, bars I J L, cross-bar K, and catch-lever R, in combination with the frame C, to which the revolving plow-frame B A is pivoted, and crank-axle F, substantially as herein shown and described, and for the purpose set forth.

3. The bent bars M, pivoted cross-bar O $o'$, spring Q, and slotted standard P, in combination with the double crank-axle F, frame C, and the teeth formed upon the lower parts of the forward arms of the frames H, substatially as herein shown and described, and for the purpose set forth.

RUDOLPH CORETH.

Witnesses:
   J. J. GROOS,
   OTTO GROOS.